United States Patent
Li et al.

(10) Patent No.: US 9,560,343 B2
(45) Date of Patent: Jan. 31, 2017

(54) APPARATUS AND METHOD FOR CALIBRATING MULTI-LAYER THREE-DIMENSIONAL (3D) DISPLAY

(71) Applicant: SAMSUNG ELECTRONICS CO., LTD., Suwon-si (KR)

(72) Inventors: Weiming Li, Beijing (CN); Mingcai Zhou, Beijing (CN); Shaohui Jiao, Beijing (CN); Tao Hong, Beijing (CN); Haitao Wang, Beijing (CN); Ji Yeun Kim, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 312 days.

(21) Appl. No.: 14/058,591

(22) Filed: Oct. 21, 2013

(65) Prior Publication Data
US 2014/0146144 A1     May 29, 2014

(30) Foreign Application Priority Data

Nov. 23, 2012 (CN) .......................... 2012 1 0482790
May 8, 2013 (KR) ........................ 10-2013-0051790
Sep. 3, 2013 (KR) ........................ 10-2013-0105308

(51) Int. Cl.
     *H04N 13/04*     (2006.01)
(52) U.S. Cl.
     CPC ...... *H04N 13/0425* (2013.01); *H04N 13/0402* (2013.01); *H04N 13/0495* (2013.01)
(58) Field of Classification Search
     CPC ................................................. H04N 13/0425
     USPC ............................................................ 348/51
     See application file for complete search history.

(56) References Cited

U.S. PATENT DOCUMENTS

| | | |
|---|---|---|
| 6,879,352 B1 | 4/2005 | Kim |
| 2004/0021917 A1* | 2/2004 | Plesniak ............. G03H 1/0808 359/9 |
| 2005/0248539 A1 | 11/2005 | Morrison et al. |
| 2007/0165942 A1 | 7/2007 | Jin et al. |
| 2010/0290697 A1 | 11/2010 | Benitez et al. |
| 2010/0321382 A1 | 12/2010 | Amaratunga et al. |
| 2012/0038632 A1 | 2/2012 | Matsunaga et al. |
| 2012/0105591 A1 | 5/2012 | Kim et al. |
| 2012/0162386 A1 | 6/2012 | Kim et al. |
| 2012/0262544 A1 | 10/2012 | Damera-Venkata et al. |

FOREIGN PATENT DOCUMENTS

| | | |
|---|---|---|
| KR | 10-2010-0136588 | 12/2010 |
| KR | 10-2012-0111570 | 10/2012 |

* cited by examiner

*Primary Examiner* — Christopher S Kelley
*Assistant Examiner* — Jonathan Messmore
(74) *Attorney, Agent, or Firm* — Harness, Dickey & Pierce, P.L.C.

(57) ABSTRACT

Provided is an apparatus and method for calibrating a multi-layer three-dimensional (3D) display (MLD) that may control a 3D display including a plurality of display layers to display a first image on one of the plurality of display layers, acquire a second image by capturing the first image, calculate a homography between the display layer and an image capturer based on the first image and the second image, and calculate geometric relations of the display layer with respect to the image capturer based on the calculated homography.

18 Claims, 3 Drawing Sheets

APPARATUS AND METHOD FOR CALIBRATING MULTI-LAYER THREE-DIMENSIONAL (3D) DISPLAY

CROSS-REFERENCE TO RELATED APPLICATIONS

This application claims the priority benefit of Chinese Patent Application No. 201210482790.2, filed on Nov. 23, 2012, in the State Intellectual Property Office of the P.R. China, Korean Patent Application No. 10-2013-0051790, filed on May 8, 2013, and Korean Patent Application No. 10-2013-0105308, filed on Sep. 3, 2013, in the Korean Intellectual Property Office, the disclosures of which are incorporated herein by reference.

BACKGROUND

1. Field

One or more example embodiments relate to three-dimensional (3D) display technology, and more particularly, to an apparatus and method for calibrating a multi-layer 3D display (MLD).

2. Description of the Related Art

Recently, a multi-layer three-dimensional (3D) display (MLD) is receiving attention in a field of 3D displays. In general, the MLD may be formed by a plurality of two-dimensional (2D) display layers laminated in a direction of thickness to produce 3D visual effects. The MLD containing various operating principles may include a depth fusion display (DFD), a parallax barrier, a light field recreation (LFR), and the like.

SUMMARY

The foregoing and/or other aspects are achieved by providing an apparatus and method for calibrating a multi-layer three-dimensional (3D) display (MLD) that may detect a position error between display layers of the MLD. Calibration refers to a method of obtaining geometric relations between display layers in a display including a plurality of display layers.

The foregoing and/or other aspects are achieved by providing a method of calibrating a 3D display including a plurality of display layers, the method including controlling the 3D display to display a first image on a single display layer, acquiring a second image by controlling an image capturer to capture the displayed first image, calculating a homography between the single display layer and the image capturer, based on the first image and the second image, and calculating geometric relations of the single display layer with respect to the image capturer, based on the calculated homography. In this example, geometric relations among the plurality of display layers may be obtained based on geometric relations of each of the plurality of display layers with respect to the image capturer, by performing the controlling, the acquiring, the calculating of the homography, and the calculating of the geometric relations for each of the plurality of display layers of the 3D display.

The acquiring may include acquiring the second image by controlling the image capturer to capture a portion of the displayed first image or the entire displayed first image.

The calculating of the homography may include extracting, from the first image, first coordinates at which a preset point is positioned in the first image, extracting, from the second image, second coordinates at which the preset point is positioned in the second image, and calculating a homography matrix between the first image and the second image, based on the first coordinates and the second coordinates.

The calculating of the geometric relations may include extracting a shift vector and a rotation matrix between the single display layer and the image capturer from the homography matrix, using an internal parameter matrix of the image capturer. When the acquiring is performed for each of the plurality of display layers of the 3D display, a position and an operation of the image capturer may be the same.

The method may further include correcting positions of the plurality of display layers, based on the geometric relations among the plurality of display layers. In addition, the method may further include adjusting a display render parameter of the 3D display, based on the geometric relations among the plurality of display layers.

The foregoing and/or other aspects are achieved by providing an apparatus for calibrating a 3D display including a plurality of display layers, the apparatus including a communication unit to communicate with the 3D display, a display controller to control, through the communication unit, the 3D display to display a first image on each of the plurality of display layers in a preset sequence, an image capturer to acquire a second image by capturing the first image displayed on each of the plurality of display layers, a homography calculator to calculate a homography between each of the plurality of display layers and the image capturer, based on the first image and the second image, and a geometric determiner to obtain geometric relations among the plurality of display layers, by calculating geometric relations of each of the plurality of display layers with respect to the image capturer, based on the calculated homography. The apparatus may further include a display unit to display the geometric relations among the plurality of display layers.

The foregoing and/or other aspects are achieved by providing an apparatus for calibrating a 3D display including N display layers, the apparatus including a display controller to control the 3D display to display an image on a display layer of the 3D display, an image capturer to capture an image of the 3D display, and a geometric determiner to determine geometric relations of the display layer with respect to the image capturer. The display controller and the image capturer may repeat, n times, an operation of controlling the image to be displayed on an $n^{th}$ display layer of the 3D display, and an operation of capturing the image of the 3D display. Here, n ranges from "1" and M, and M denotes an integer less than or equal to N. The geometric determiner may determine the geometric relations of the display layer with respect to the image capturer, based on a relationship between the image displayed on the $n^{th}$ display layer and the image of the 3D display.

The geometric determiner may extract, from the image displayed on the $n^{th}$ display layer, first coordinates at which a preset point is positioned in the image displayed on the $n^{th}$ display layer, extract, from the image of the 3D display, second coordinates at which the preset point is positioned in the image of the 3D display, and determine the geometric relations of the display layer with respect to the image capturer, based on the first coordinates and the second coordinates.

The geometric determiner may calculate a homography matrix between the image displayed on the $n^{th}$ display layer and the image of the 3D display, based on the first coordinates and the second coordinates, and determine the geometric relations of the display layer with respect to the image capturer, based on the homography matrix.

The example embodiments may include an apparatus and method for calibrating an MLD that may control a 3D display to display an image on each display layer, capture the displayed image, and obtain geometric relations among a plurality of display layers based on a homography between the displayed image and the captured image.

The foregoing and/or other aspects are achieved by providing a method for calibrating a multi-layer three-dimensional display (MLD) including controlling the MLD to display a first image on a first display layer of the MLD display, acquiring a second image by controlling an image capturer to capture the first image displayed on the first layer of the MLD and calculating a homography between the first display layer and an image plane of the image capturer based on the first image and the second image.

The foregoing and/or other aspects are achieved by providing a multi-layer three-dimensional (3D) display (MLD) including a calibrating apparatus. The MLD includes a display controller to control the MLD to display a first image on a first display layer of the MLD display, an image capturer to capture the first image displayed on the first layer of the MLD, and a homography calculator to calculate a homography between the first display layer and an image plane of the image capturer based on the first image and the second image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
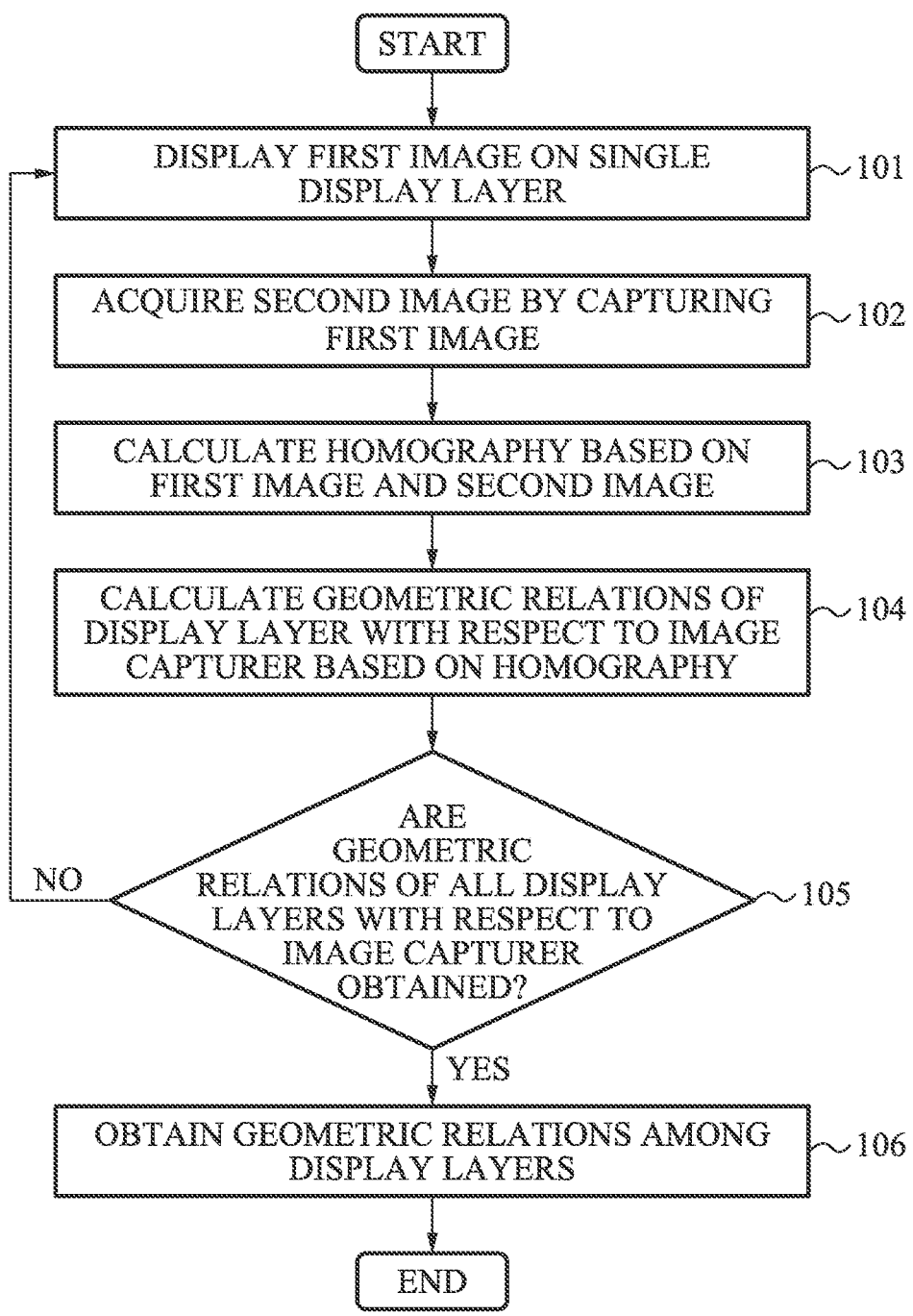
FIG. 1 illustrates a method of calibrating a multi-layer three-dimensional (3D) display (MLD) according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a method of calibrating a multi-layer three-dimensional (3D) display (MLD) according to example embodiments. Hereinafter, the MLD will be also referred to as the 3D display.

Calibration refers to a method of obtaining geometric relationships between display layers in a display including a plurality of display layers such as the 3D display described here. In operation 101, a first image may be displayed on a single display layer by controlling the 3D display. For example, the 3D display may display the first image using a single display layer. The first image may be displayed on a single display layer through debugging, control of an interface, or use of a button and/or a setting interface of the 3D display. Here, the first image may include any image.

In operation 102, a second image may be acquired by controlling an image capturer to capture the displayed first image. After the first image is displayed on one of the plurality of display layers in operation 101, the first image displayed by the 3D display may be captured so that the second image in operation 102 may be acquired. In this example, the second image may include the captured first image. The image capturer may be implemented using image sensors, for example, a charge coupled device (CCD) sensor, a complementary metal-oxide-semiconductor transistor (CMOS) sensor, and the like. In an embodiment, the image capturer may capture the image on an image plane of the image capturer.

In operation 103, a homography between the single display layer and an image plane of the image capturer may be calculated based on the first image and the second image.

In particular, a homography matrix between the first image and the second image may be calculated, based on coordinates in the first image at which a first point is positioned in the first image and coordinates in the second image at which a second point corresponding to the first point is positioned in the second image. The homography matrix refers to a homography between the image plane of the image capturer and the display layer on which the first image is displayed.

For example, first coordinates in the first image at which a preset point p is positioned in the first image may be obtained. In addition, since the second image may be acquired by capturing the first image, second coordinates at which the preset point p is positioned in the second image may be obtained. The homography matrix between the first image and the second image may be calculated based on the first coordinates and the second coordinates. Also, a homography between the first image and the second image may be generated using a plurality of points, from coordinates at which the plurality of points are positioned in the first image and coordinates at which points corresponding to the plurality of points are positioned in the second image. Here, the homography may be generated using a conventional homography matrix calculation algorithm.

By way of example, the homography between the first image and the second image may be expressed by Equation 1.

$$\sigma m_i = H \cdot M_i, i \in [1, N]$$ [Equation 1]

In Equation 1, σ denotes a scale factor, $m_i$ denotes homogeneous coordinates of second coordinates of an $i^{th}$ point, H denotes a homography matrix, and N denotes a number of points.

As described above, the homography matrix H may be obtained through Equation 1.

When the displayed first image is captured, a portion of the displayed first image or the entire displayed first image may be captured. In particular, when it is possible to capture a plurality of points, for example, the N points of Equation 1, to be used for generating the homography, the second image including a portion of the first image or the entire first image may be captured. The captured second image may include the plurality of points to be used for generating the homography.

As a value of N increases, a function to control noise may be improved, whereas an amount of corresponding calculation may increase. Accordingly, the value of N may be determined by demand. N≥4 may be selected as a compromise value in view of an increase in calculation and noise removal performance.

Figure 3:
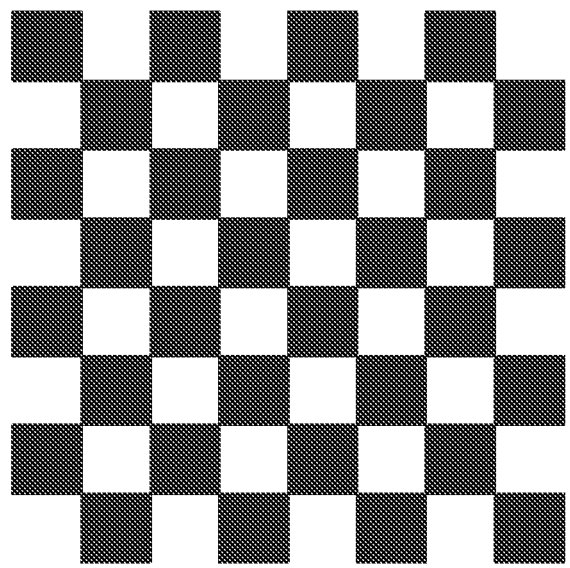
FIG. 3 illustrates a first image according to example embodiments.

In addition, feature points of an image may be extracted using the first image. For example, the first image may correspond to a grid image, and corners of the grid image may be determined to be the feature points. FIG. 3 illustrates an example of the grid image.

In operation 104, geometric relations of the single display layer with respect to the image plane of the image capturer may be calculated based on the homography calculated in operation 103.

In particular, 3D rotations and shift relations between the single display layer and the image plane of the image capturer may be extracted from the homography matrix H calculated in operation 103. The 3D rotations and shift relations may be determined to be the geometric relations of the single display layer with respect to the image plane of the image capturer. The homography matrix H may be an internal parameter matrix of the image capturer, a rotation matrix, and a matrix generated using a shift vector. Here, the rotation matrix may indicate a 3D rotation relation between the image plane of the image capturer and the single display layer, for example, a rotation relation between a position at which the second point of the second coordinates is present on the image plane of the image capturer and a corresponding position at which the first point of the corresponding first coordinates is present on the single display layer. The shift vector may indicate a shift relation between the image plane of the image capturer and the single display layer, for example, a shift relation between the position at which the second point of the second coordinates is present on the image plane of the image capturer and the position at which the corresponding first point of the corresponding first coordinates is present on the single display layer. Accordingly, when the homography matrix H and the internal parameter matrix are obtained, the rotation matrix and the shift vector may be calculated.

By way of example, the homography matrix H may be expressed by Equation 2.

$$H \cdot K \cdot [r_1 r_2 T] \quad \text{[Equation 2]}$$

In Equation 2, $r_1$ and $r_2$ denote a first matrix and a second matrix of a rotation matrix R, respectively. T denotes a shift vector, H denotes a homography matrix, and K denotes an internal parameter matrix of the image capturer.

When the homograph matrix H and the internal parameter matrix K have already been obtained, the rotation matrix R and the shift vector T may be calculated using Equation 2. In particular, $r_1$ and $r_2$ may be obtained based on Equation 2. Since the rotation matrix R corresponds to an orthogonal matrix, a third matrix $r_3$ of the rotation matrix R may be expressed by an equation $r_3 = r_1 \times r_2$. Here, "x" denotes an outer product operation of a vector.

When the rotation matrix R has already been obtained, rotation angles $a_x$, $a_y$, and $a_z$ of a plane including the single display layer with respect to the image plane of the image capturer may be calculated, as expressed by Equation 3.

$$a_x = -\arccos(v_x^T R v_x), a_y = -\arccos(v_y^T R v_y), a_z = -\arccos(v_z^T R v_z) \quad \text{[Equation 3]}$$

In Equation 3, $v_x$, $v_y$, and $v_z$ denote unit matrix vectors corresponding to directions of three coordinate axes X, Y, and Z of a local 3D coordinate system of the single display layer, respectively.

A scheme of obtaining the internal parameter matrix of the image capturer is well-known in the art and thus, a detailed description will be omitted herein. By way of example, the internal parameter matrix may be expressed by Equation 4.

$$K = \begin{bmatrix} f_u & s & u_0 \\ 0 & f_v & v_0 \\ 0 & 0 & 1 \end{bmatrix} \quad \text{[Equation 4]}$$

In Equation 4, $[u_0, v_0]$ denotes coordinates at which a principle point is positioned in the second image or the image plane of the image capturer. $f_u$ and $f_v$ denote focal lengths present in directions of two coordinate axes of the second image or the image plane of the image capturer, and s denotes an inclination factor of the two coordinate axes.

In operation 105, whether operations 101 through 104 are performed for all display layers of the 3D display may be verified.

When operations 101 through 104 are already performed for all display layers of the 3D display, operation 106 may be performed.

When operations 101 through 104 have yet to be performed for all display layers of the 3D display, operations 101 through 104 may be performed for all remaining display layers.

By performing the operations described above, geometric relations of each of the plurality of display layers of the 3D display with respect to an image plane of the image capturer may be obtained.

In operation 106, geometric relations among the plurality of display layers may be obtained based on the geometric relations of each of the plurality of display layers with respect to the image plane of the image capturer, whereby a 3D display calibration may be completed. For example, when rotations and shift relations between each display layer and the image plane of the image capturer are obtained, the rotations and shift relations among the plurality of display layers may be obtained.

By performing operations 101 through 104 for each display layer of the 3D display, the geometric relations among the plurality of display layers may be obtained based on the geometric relations of each display layer with respect to the image plane of the image capturer. Here, while operations 101 through 104 are being performed for each display layer, a position and an operation of the image capturer may be the same, and a position and an operation of the 3D display may be the same as well.

The method of calibrating the MLD according to example embodiments may be implemented by a computer program. The computer program may be loaded on a control apparatus that may control the image capturer and a display unit of the 3D display. The image capturer and the display unit of the 3D display may be controlled through the computer program to perform corresponding calibration operations.

Optionally, the method of calibrating the MLD according to example embodiments may further include determining whether a product meets predetermined design requirements by verifying whether the geometric relations among the plurality of display layers satisfy design requirements, based on the obtained geometric relations among the plurality of display layers of the 3D display.

In addition, when the geometric relations do not satisfy the design requirements, a physical correction may be performed for positions of the plurality of display layers using the obtained geometric relations among the plurality of display layers of the 3D display in order for the geometric relations among the plurality of display layers to satisfy the design requirements.

Further, whether the correction is successful may be determined by detecting more geometric relations and providing feedback on a result of the correction.

Optionally, the method of calibrating the MLD according to example embodiments may further include adjusting a display render parameter of the 3D display, based on the geometric relations among the plurality of display layers of the 3D display, in order to reduce a time error occurring due to an error in the positions of the plurality of display layers. In particular, degradation in a display function resulting from the error in the positions may be prevented through software.

Figure 2:
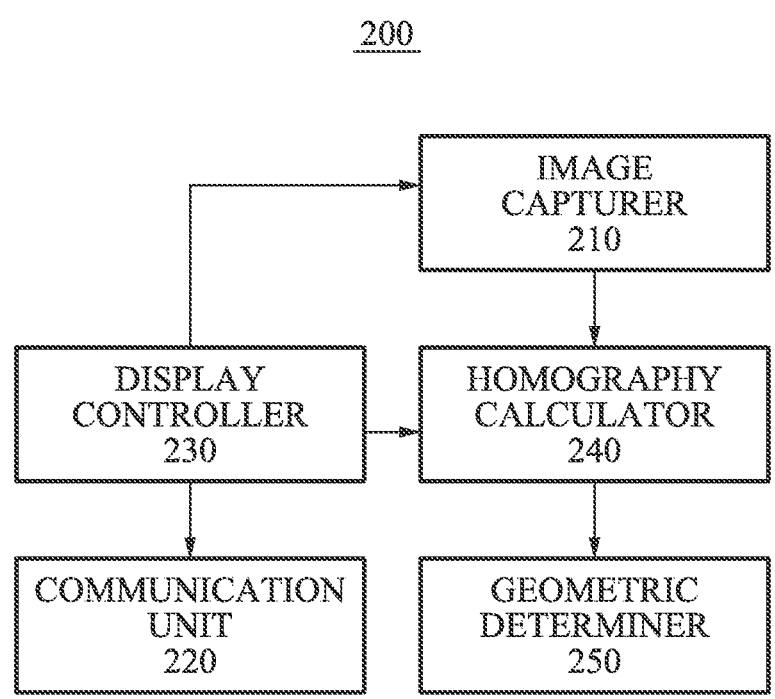
FIG. 2 illustrates an apparatus for calibrating an MLD according to example embodiments.

FIG. 2 illustrates an apparatus 200 for calibrating an MLD according to example embodiments.

Referring to FIG. 2, the apparatus 200 may include, for example, an image capturer 210, a communication unit 220, a display controller 230, a homography calculator 240, and a geometric determiner 250.

The image capturer 210 may capture an image. The image capturer 210 may be implemented using one or more types of image sensors, for example, a CCD sensor, a CMOS sensor, and the like.

The communication unit 220 may be used by the apparatus 200 to communicate with a 3D display to be calibrated. The communication unit 220 may include a wired communication apparatus or a wireless communication apparatus.

The display controller 230 may control the 3D display through the communication unit 220. In particular, the display controller 230 may control, through the communication unit 220, the 3D display to display a first image on each of a plurality of display layers of the 3D display in a preset sequence. For example, the first image may be displayed on a single display layer.

The display controller 230 may transmit, through the communication unit 220, the first image and a related display control command to the 3D display to display the first image. In addition, the display controller 230 may determine the first image to be a default test image, and store the first image in the 3D display and the apparatus 200. In this example, transmission of the first image between the 3D display and the apparatus 200 may be unnecessary since the 3D image may already be stored in the 3D display.

When the display controller 230 displays the first image on a single display layer of the 3D display, the image capturer 210 may capture the first image displayed on the single display layer to acquire a second image. Accordingly, a plurality of second images may be acquired by capturing the first image displayed on each of the plurality of display layers. Each of the plurality of second images may correspond to the first image displayed on each of the plurality of display layers.

Here, when the first image displayed on each display layer is captured, a position and an operation of the image capturer 210 may be the same.

The homography calculator 240 may calculate a homography between each of the plurality of display layers and the image capturer 210, based on the first image and the second image. In particular, the homography between the display layer and the image capturer 210 may be calculated based on the first image and the second image corresponding to the first image displayed on the single display layer, in particular, the second image including the first image displayed on the single display layer.

More particularly, the homography calculator 240 may calculate a homography matrix between the first image and the second image, based on first coordinates in the first image at which a first point is positioned in the first image and second coordinates in the second image at which a second point corresponding to the first point is positioned in the second image. The homography matrix refers to a homography between a display layer of the first image and the image capturer 210. The homography matrix may be calculated using Equation 1 or any conventional technique.

The homography calculator 240 may be implemented by hardware. The homography calculator 240 may be implemented using a processor such as a field programmable gate array (FPGA) or an application specific integrated circuit (ASIC), depending on processing to be performed by the homography calculator 240.

The geometric determiner 250 may obtain geometric relations among the plurality of display layers, by calculating geometric relations of each display layer with respect to the image capturer 210 based on the calculated homography.

The geometric determiner 250 may calculate rotations and shift relations between each display layer and the image capturer 210, using Equation 2, or using Equations 2 and 3. When the rotations and shift relations of each display layer with respect to the image capturer 210 are obtained, the geometric determiner 250 may obtain rotations and shift relations among the plurality of display layers.

The geometric determiner 250 may be implemented by hardware. The geometric determiner 250 may be implemented using a processor such as an FPGA or an ASIC, depending on processing to be performed by the geometric determiner 250.

In addition, in order to reduce a time error occurring due to an error in positions of the plurality of display layers, the display controller 230 may control, through the communication unit 220, the 3D display to adjust a display render parameter of the 3D display, based on the obtained geometric relations among the plurality of display layers.

In other example embodiments, the apparatus 200 may further include a display unit (not shown). The display unit may display the geometric relations among the plurality of display layers. For example, the rotations and shift relations among the plurality of display layers may be displayed.

Figure 4:
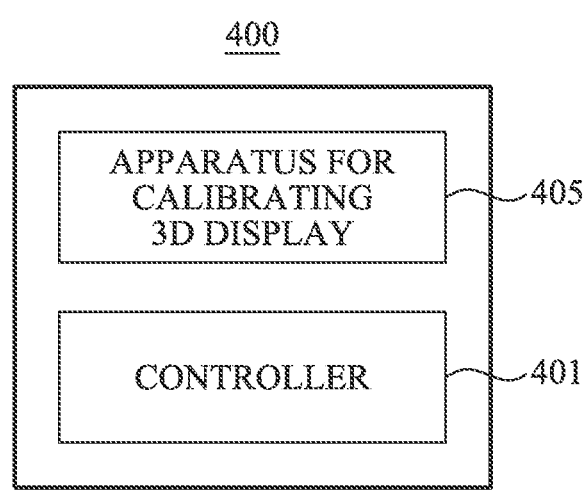
FIG. 4 illustrates a 3D display 400 including an apparatus for calibrating the 3D display according to example embodiments.

FIG. 4 illustrates a 3D display 400 including an apparatus for calibrating the 3D display according to example embodiments.

Referring to FIG. 4, the 3D display 400 may include, for example, a controller 401 and an apparatus for calibrating the 3D display 405.

Examples of the 3D display may include a tablet computing device, a portable gaming device, a 3D television display or a portable 3D monitor such as in a laptop computer.

The controller 401 may generate one or more control signals to control the 3D display device 400 and the apparatus for calibrating the 3D display 405. The controller 401 may include one or more processors.

The apparatus for calibrating the 3D display 405 may be used to calibrate the 3D display device 400 and may include, for example, an image capturer 410, a communication unit 420, a display controller 430, a homography calculator 440, and a geographic determiner 450. None of items 410-450 are illustrated in FIG. 4. However, each of these units may correspond to similarly named modules 210-250 discussed herein, for example with respect to FIG. 2, and therefore need not be discussed further here.

The apparatus for calibrating the 3D display 405 may be installed internally within the 3D display device 400, may be attached to the 3D display device 400, or may be separately embodied from the 3D display device 400. Regardless of its physical configuration, the image apparatus for calibrating the 3D display 405 has all of the capabilities discussed herein. The apparatus for calibrating the 3D display 405 may include one or more internal processors such as display controller 230 or may be controlled by the one or more processors included within the 3D display device 400 such as the one or more processors of controller 401.

According to example embodiments, an apparatus and method for calibrating an MLD may control the 3D display to display an image on each display layer, capture the displayed image, and obtain geometric relations among a plurality of display layers based on a homography between the displayed image and the captured image.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the apparatuses for calibrating the 3D display described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of calibrating a three-dimensional (3D) display including a plurality of display layers, the method comprising:
controlling, for each of the plurality of display layers, the 3D display to display an associated first image on a display layer of the plurality of display layers, wherein the associated first image is a two-dimensional (2D) image and the associated first image is displayed on the 3D display;
acquiring, for each of the plurality of display layers, an associated second image by controlling an image capturer to capture the displayed associated first image;
calculating, for each of the plurality of display layers, a homography matrix between the display layer and an image plane of the image capturer, based on the associated first image and the associated second image;
calculating, for each of the plurality of display layers, geometric relations of the display layer with respect to the image plane of the image capturer, based on the calculated homography matrix; and
obtaining geometric relations among the plurality of display layers based on the geometric relations of each of the plurality of display layers.

2. The method of claim 1, wherein the calculating the homography matrix comprises:
extracting, from the associated first image, first coordinates at which a preset point is positioned in the associated first image;
extracting, from the associated second image, second coordinates at which a second point corresponding to the preset point is positioned in the associated second image; and
calculating the homography matrix between the associated first image and the associated second image, based on the first coordinates and the second coordinates.

3. The method of claim 1, wherein the calculating, for each of the plurality of display layers, the geometric relations further includes extracting a shift vector and a rotation matrix between the display layer and the image plane of the image capturer from the homography matrix, using an internal parameter matrix of the image capturer.

4. The method of claim 1, wherein a position and an operation of the image capturer are the same for each of the plurality of display layers when the acquiring is performed.

5. The method of claim 1, further comprising:
correcting positions of the plurality of display layers, based on the geometric relations among the plurality of display layers.

6. The method of claim 1, further comprising:
adjusting a display render parameter of the 3D display, based on the geometric relations among the plurality of display layers.

7. The method of claim 1, wherein the acquiring comprises acquiring the associated second image by controlling the image capturer to capture a portion of the displayed associated first image or the entire displayed associated first image.

8. The method of claim 1, further comprising:
verifying whether the geometric relations among the plurality of display layers satisfy design requirements of the 3D display, based on the obtained geometric relations among the plurality of display layers of the 3D display.

9. A non-transitory computer-readable storage medium encoded with computer readable code comprising a program for implementing the method of claim 1.

10. An apparatus for calibrating a three-dimensional (3D) display comprising a plurality of display layers, the apparatus comprising:
a communication unit to communicate with the 3D display;
a display controller to control, through the communication unit, the 3D display to display an associated first image on each of the plurality of display layers in a preset sequence, wherein the associated first image is a two-dimensional (2D) image and the associated first image is to be displayed on the 3D display;
an image capturer to acquire an associated second image by capturing the first image displayed on each of the plurality of display layers;
a homography matrix calculator to calculate a homography matrix between each of the plurality of display layers and an image plane of the image capturer, based on the associated first image and the associated second image; and a geometric determiner to obtain geometric relations among the plurality of display layers, by calculating geometric relations of each of the plurality of display layers with respect to the image plane of the image capturer, based on the calculated homography matrix.

11. The apparatus of claim 10, wherein the homography calculator calculates the homography matrix between the associated first image and the associated second image, based on coordinates in the first image at which a first point is positioned in the associated first image, and coordinates in the associated second image at which a second point corresponding to the first point is positioned in the associated second image.

12. The apparatus of claim 10, wherein the geometric determiner is configured to extract a shift vector and a rotation matrix between the display layer and the image plane of the image capturer from the homography matrix, using an internal parameter matrix of the image capturer, for each of the plurality of display layers.

13. The apparatus of claim 10, wherein a position and an operation of the image capturer are the same when the associated first image displayed on each of the plurality of display layers of the 3D display is captured.

14. The apparatus of claim 10, wherein the display controller is configured to control, through the communication unit, the 3D display to adjust a display render parameter of the 3D display, based on the geometric relations among the plurality of display layers.

15. The apparatus of claim 10, further comprising:
a display unit to display positional relationships among the plurality of display layers.

16. An apparatus for calibrating a three-dimensional (3D) display including N display layers, the apparatus comprising:
a display controller to control the 3D display to display an image on a display layer of the 3D display, wherein the associated image is a two-dimensional (2D) image and the associated image is to be displayed on the 3D display;

an image capturer to capture an image of the 3D display; and a geometric determiner to determine geometric relations of the display layer with respect to an image plane of the image capturer, wherein the display controller and the image capturer repeat, n times, an operation of controlling the image to be displayed on an $n^{th}$ display layer of the 3D display, and an operation of capturing the image of the 3D display, respectively, and the geometric determiner is configured to determine the geometric relations of each display layer with respect to the image plane of the image capturer, based on a relationship between the associated image displayed on the $n^{th}$ display layer and the associated image of the 3D display, wherein n ranges from "1" and M, and M denotes an integer less than or equal to N.

17. The apparatus of claim 16, wherein the geometric determiner is configured to:
extract, from the associated image displayed on the $n^{th}$ display layer, first coordinates at which a preset point is positioned in the associated image displayed on the $n^{th}$ display layer;

extract, from the associated image of the 3D display, second coordinates at which the preset point is positioned in the associated image of the 3D display; and determine the geometric relations of the associated display layer with respect to the image plane of the image capturer, based on the first coordinates and the second coordinates.

18. The apparatus of claim 17, wherein the geometric determiner is configured to:
calculate a homography matrix between the associated image displayed on the $n^{th}$ display layer and the associated image of the 3D display, based on the first coordinates and the second coordinates; and determine the geometric relations of the associated display layer with respect to the image plane of the image capturer, based on the homography matrix.

* * * * *